(12) United States Patent
Kim et al.

(10) Patent No.: US 8,091,133 B2
(45) Date of Patent: Jan. 3, 2012

(54) APPARATUS AND METHOD FOR DETECTING MALICIOUS PROCESS

(75) Inventors: Yun Ju Kim, Gyeonggi-do (KR); Young Tae Yun, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 884 days.

(21) Appl. No.: 12/103,794

(22) Filed: Apr. 16, 2008

(65) Prior Publication Data

US 2009/0070876 A1 Mar. 12, 2009

(30) Foreign Application Priority Data

Sep. 7, 2007 (KR) .................... 10-2007-0090906

(51) Int. Cl.
*G06F 11/00* (2006.01)
*G06F 12/14* (2006.01)
*G06F 12/16* (2006.01)
*G08B 23/00* (2006.01)
*G06F 9/455* (2006.01)

(52) U.S. Cl. .................... 726/23; 726/24; 718/1
(58) Field of Classification Search .............. 726/22–25; 718/1
See application file for complete search history.

(56) References Cited

U.S. PATENT DOCUMENTS

| | | | | |
|---|---|---|---|---|
| 6,981,279 | B1 * | 12/2005 | Arnold et al. .................... | 726/22 |
| 7,370,360 | B2 * | 5/2008 | van der Made ................. | 726/24 |
| 7,464,407 | B2 * | 12/2008 | Nakae et al. .................... | 726/22 |
| 7,472,420 | B1 * | 12/2008 | Pavlyushchik ................. | 726/24 |
| 7,631,353 | B2 * | 12/2009 | Kennedy et al. ................ | 726/22 |
| 7,690,023 | B2 | 3/2010 | Kato et al. | |
| 7,904,957 | B2 | 3/2011 | Imai | |
| 2003/0051026 | A1 * | 3/2003 | Carter et al. ................... | 709/224 |
| 2004/0049693 | A1 * | 3/2004 | Douglas ......................... | 713/200 |
| 2006/0150256 | A1 * | 7/2006 | Fanton et al. ................... | 726/27 |
| 2007/0094496 | A1 * | 4/2007 | Burtscher ...................... | 713/164 |
| 2008/0172739 | A1 * | 7/2008 | Nakae et al. .................... | 726/22 |
| 2009/0089040 | A1 * | 4/2009 | Monastyrsky et al. .......... | 703/26 |

(Continued)

FOREIGN PATENT DOCUMENTS

JP 2005-100124 A 4/2005

(Continued)

OTHER PUBLICATIONS

Carsten Willems, et al; "Toward Automated Dynamic Malware Analysis Using CWSandbox", IEEE Security and Privacy, IEEE Computer Society, New York, NY, US, vol. 5, No. 2, Mar. 1, 2007, pp. 32-39, XP011175985; ISSN: 1540-7993, (p. 33-p. 34).

(Continued)

*Primary Examiner* — Christian Laforgia
(74) *Attorney, Agent, or Firm* — Ladas & Parry LLP

(57) ABSTRACT

Provided are an apparatus and method for detecting a malicious process. The apparatus includes: a process monitoring unit for monitoring a process generated in a computing environment; a target process setting unit for previously setting a test target process among the processes confirmed by the process monitoring unit; a process generation time change monitoring unit for monitoring if the target process set by the target process setting unit requests to change a generation time; a generation time change preventing unit for preventing a change in the generation time of the target process when the target process requests to change the generation time; and a malicious process detecting unit for determining that a child process of the target process set by the target process setting unit is a malicious process if the child process is generated within a predetermined reference time.

12 Claims, 4 Drawing Sheets

U.S. PATENT DOCUMENTS

| | | | |
|---|---|---|---|
| 2009/0089878 A1* | 4/2009 | Monastyrsky et al. | 726/22 |
| 2009/0126015 A1* | 5/2009 | Monastyrsky et al. | 726/23 |
| 2009/0126016 A1* | 5/2009 | Sobko et al. | 726/23 |

FOREIGN PATENT DOCUMENTS

| | | |
|---|---|---|
| JP | 2007-220007 A | 8/2007 |
| KR | 1020050112485 A | 11/2005 |
| KR | 1020060067117 | 6/2006 |
| KR | 1020070029540 A | 3/2007 |
| KR | 2008-0043201 | 5/2008 |
| KR | 1020080047361 A | 5/2008 |
| WO | 01/57629 A2 | 8/2001 |
| WO | 03/050662 A1 | 6/2003 |
| WO | 2004/075060 A1 | 9/2004 |

OTHER PUBLICATIONS

European Search Report: EP 08 16 1569.
Frank Apap, et al; "Detecting Malicious Software by Monitoring Anomalous Windows Registry Accesses" Lecture Notes in Computer Science, vol. 2516/2002.

* cited by examiner

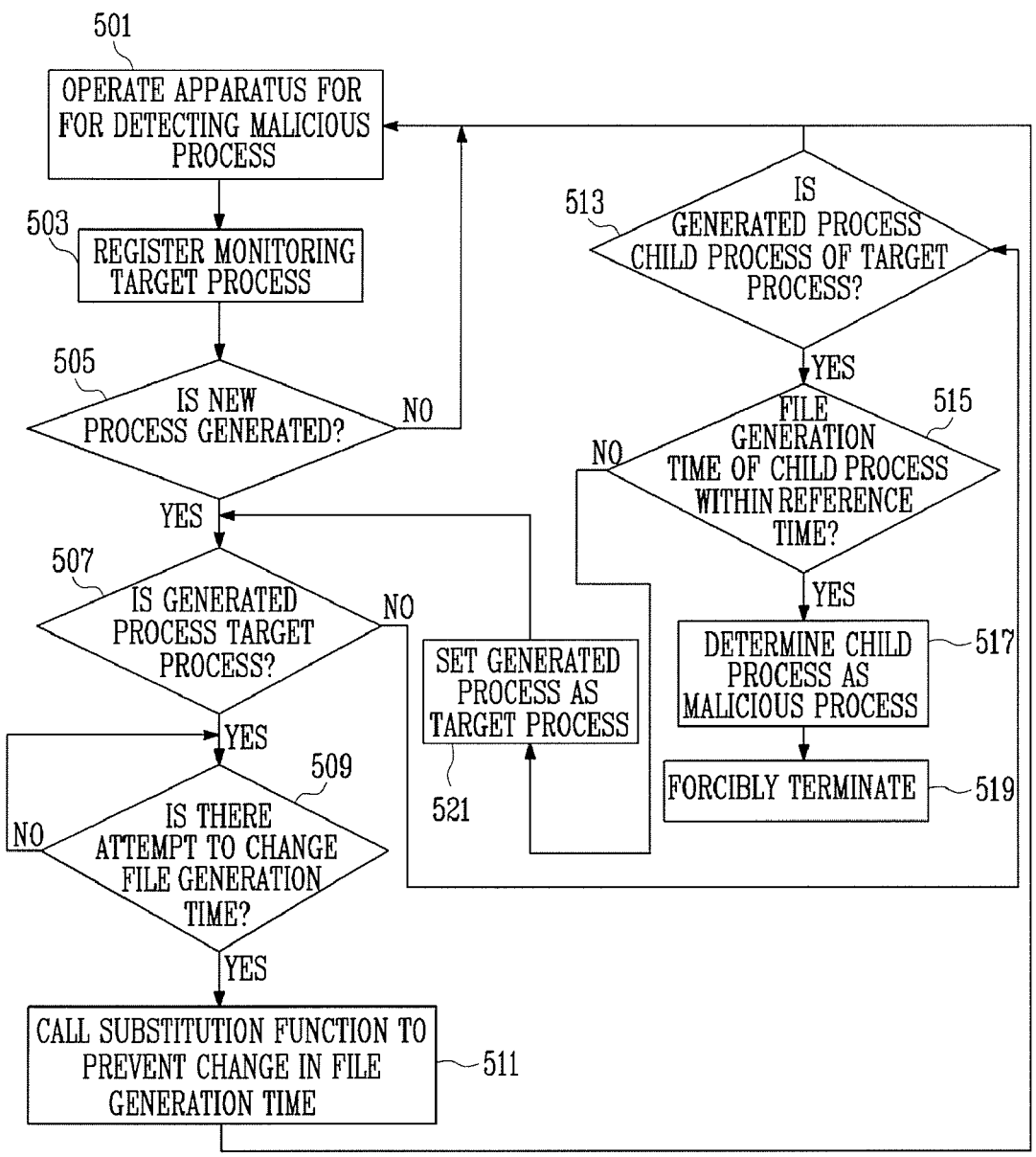

APPARATUS AND METHOD FOR DETECTING MALICIOUS PROCESS

CROSS-REFERENCE TO RELATED APPLICATION

This application claims priority to and the benefit of Korean Patent Application No. 2007-0090906, filed Sep. 7, 2007, the disclosure of which is incorporated herein by reference in its entirety.

BACKGROUND

1. Field of the Invention

The present invention relates to an apparatus and method for detecting a malicious process and, more particularly, to an apparatus and method for detecting a malicious process which can monitor not only a target process but also child processes generated by the target process so as to detect malicious behavior generating a malicious process from a normal process.

2. Discussion of Related Art

In recent years, programs such as MS Office Word, MS Office PowerPoint, MS Office Excel, Hangul, and MS Windows Media Player, which support specific extensions frequently used in the computing environment, have frequently been attacked by executing arbitrary codes hidden in files using weak points of the programs. In this technique, when a file in which a malicious code is hidden is propagated via an e-mail or messenger, a user has only to execute the file using the corresponding program to execute the malicious program. Therefore, it is hard for a common user to become aware of an attack against the program, and the attack detrimentally affects the corresponding system.

Although many conventional methods have been tried in attempts to prevent the execution of malicious processes, most of them may only be effective when the malicious processes are executed by supporting specific macro modes.

SUMMARY OF THE INVENTION

The present invention is directed to a method and apparatus for detecting a malicious process.

Also, the present invention is directed to an apparatus and method for detecting a malicious process in which malicious behavior to generate a malicious process is detected from a normal process on the basis of a time required for generating file of child process which is generated by target process One aspect of the present invention provides an apparatus for detecting a malicious process. The apparatus includes: a process monitoring unit for monitoring a process generated in a computing environment; a target process setting unit for previously setting a test target process among the processes confirmed by the process monitoring unit; a file generation time change monitoring unit for monitoring if the target process set by the target process setting unit requests to change a file generation time; a file generation time change preventing unit for preventing a change in the file generation time of the target process when the target process requests to change the file generation time; and a malicious process detecting unit for determining that a child process of the target process set by the target process setting unit is a malicious process if the child process generates a file within a predetermined reference time.

The apparatus may further include: a forced termination unit for forcibly terminating the child process determined as the malicious process by the malicious process detecting unit; and a result output unit for outputting a determination result of the malicious process detecting unit. The target process set by the target process setting unit executes a previously monitored target file. The file generation time change monitoring unit monitors if the target process calls an Application Program Interface (API) required for changing the file generation time. The file generation time change preventing unit provides a substitution function stored therein instead of the API called by the target process to prevent the change in the file generation time of the target process. The child process is generated by the target process set by the target process setting unit. When the malicious process detecting unit determines that the child process is not a malicious process, the target process setting unit sets the child process as a target process.

Another aspect of the present invention provides a method for detecting a malicious process. The method includes: Monitoring if a process generated in a computing environment is a child process of a preset target process; and recognizing the generated process as a malicious process when the process monitored to be the child process generates a file within a predetermined reference time.

The method may further include: The preset target process executes a previously monitored targeted file. The child process is generated by the preset target process. Monitoring if the generated process calls an Application Program Interface (API) required for changing a file generation time and providing a substitution function instead of the API when the generated process is the preset target process. Registering the generated process as a target process when the process monitored to be the child process generates the file longer than the predetermined reference file Forcibly terminating the process recognized as the malicious process.

BRIEF DESCRIPTION OF THE DRAWINGS

The above and other features and advantages of the present invention will become more apparent to those of ordinary skill in the art by describing in detail exemplary embodiments thereof with reference to the attached drawings in which:

FIG. 5 is a flowchart illustrating a method for detecting a malicious process according to an exemplary embodiment of the present invention.

DETAILED DESCRIPTION OF EMBODIMENTS

Hereinafter, exemplary embodiments of the present invention will be described in detail. However, the present invention is not limited to the embodiments disclosed below, but can be implemented in various forms. The following embodiments are described in order to enable those of ordinary skill in the art to embody and practice the present invention.

Figure 1:
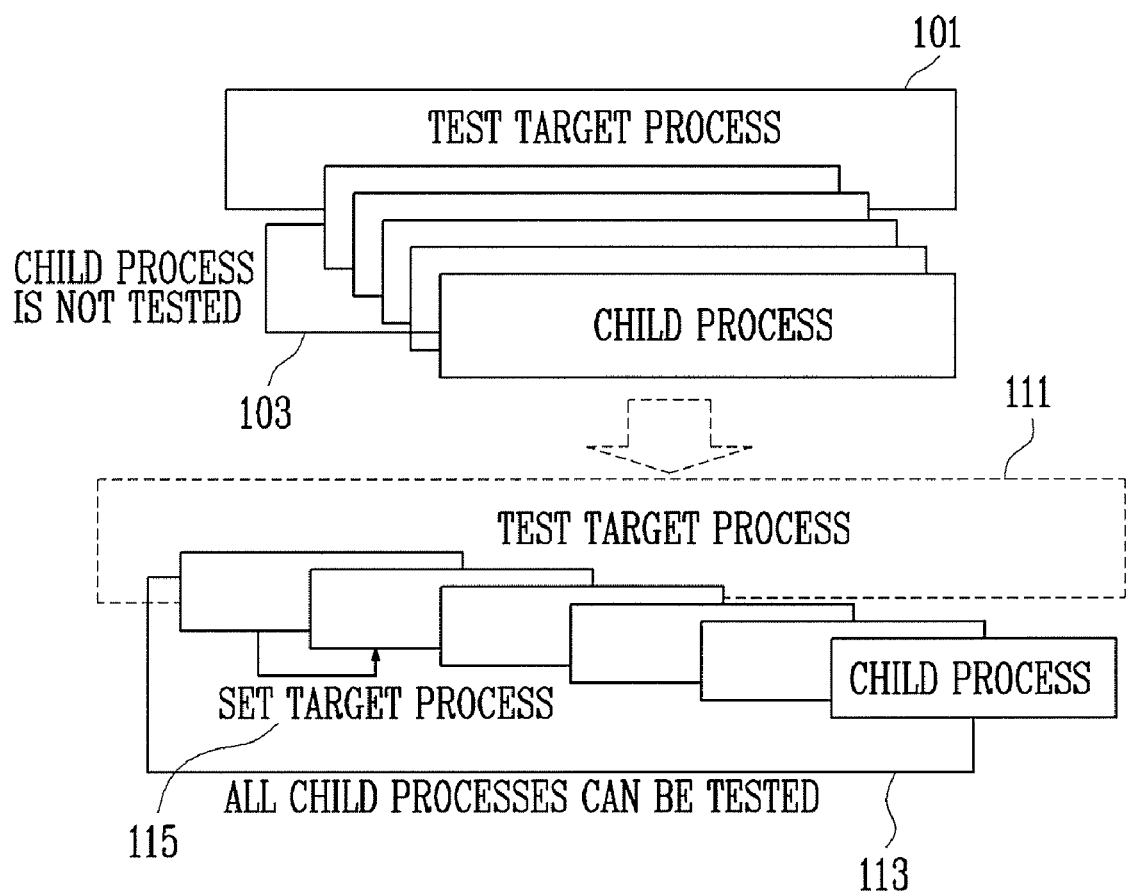
FIG. 1 is a schematic diagram showing a difference between a conventional method for detecting a malicious process and a method for detecting a malicious process according to an exemplary embodiment of the present invention.

FIG. 1 is a schematic diagram showing a difference between a conventional method for detecting a malicious process and a method for detecting a malicious process according to an exemplary embodiment of the present invention.

Referring to FIG. 1, reference numerals 101 and 103 are used to describe a conventional method for detecting a malicious process.

Referring to FIG. 1, assuming that there is a test target process 101, a conventional method for detecting a malicious process is aimed at searching for only a malicious process from the target process 101 and removing the same. Thus, when the test target process 101 is normally executed to generate a child process and the child process is executed to generate subordinate child processes 103 again, the child processes 103 are not tested. In particular, when a target process is a specific general-use program, for example, MS Office Word or Haansoft Hangul, there is a conventional method for detecting a child process executed using macros included in the specific program. However, there is no way to detect malicious processes from subordinate child processes generated in nonspecific ways.

By comparison, according to the present invention, assuming that there is a test target process 111, it is possible to test all generated child processes 113 during normal execution of the target process 111.

In the present invention, when the child process 113 is generated, it is determined if the child process 113 is normal. Also, when the child process 113 is determined to be normal, the child process 113 is also set as a target process (refer to 115) so that subordinate child processes generated by executing the child process 113 can be tested.

Therefore, when the target process 111 is executed to generate the child process 113 and the child process 113 is executed to generate subordinate child processes, even if any malicious process is generated, the method according to the present invention can deal with the malicious process.

Figure 2:
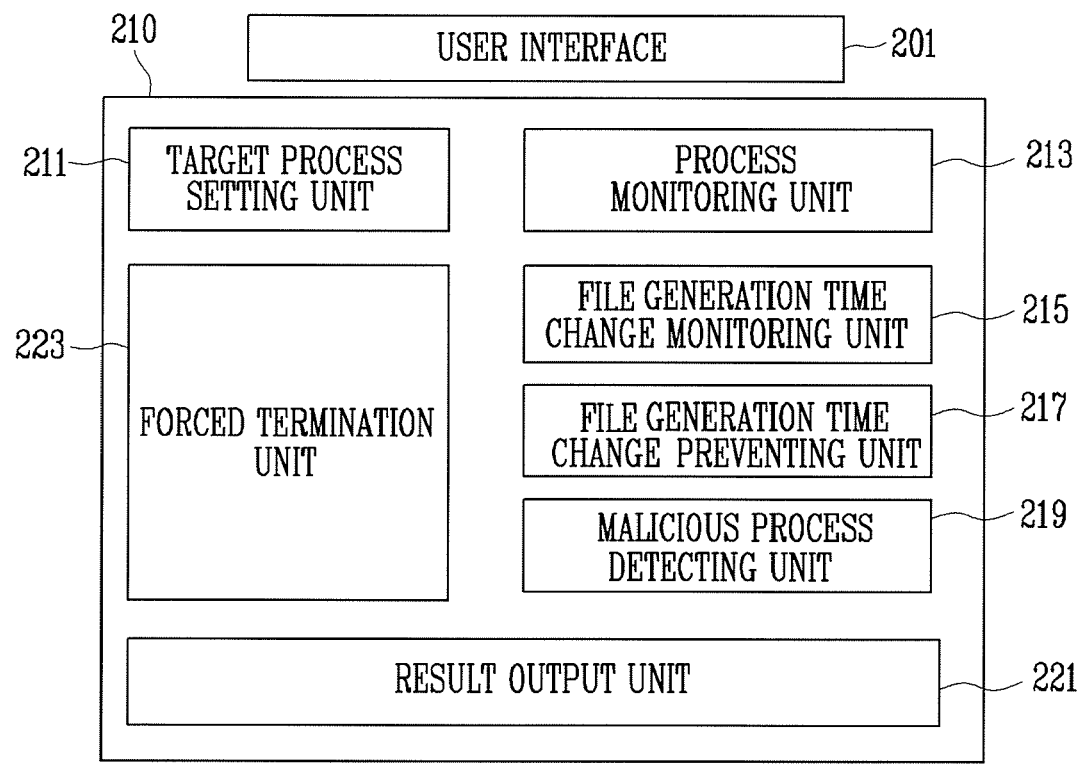
FIG. 2 is a block diagram of an apparatus for detecting a malicious process according to an exemplary embodiment of the present invention.

FIG. 2 is a block diagram of an apparatus for detecting a malicious process according to an exemplary embodiment of the present invention.

Referring to FIG. 2, the apparatus for detecting the malicious process includes a user interface 201 and a malicious process detector 210. The malicious process detector 210 includes a target process setting unit 211, a process monitoring unit 213, a file generation time change monitoring unit 215, a file generation time change preventing unit 217, a malicious process detecting unit 219, a result output unit 221, and a forced termination unit 223.

When a user tries detecting a malicious process using a method or apparatus according to the present invention in the computing environment, the user interface 201 functions to easily describe or express the method or apparatus to offer convenience to the user. Thus, the user interface 201 allows the user to properly use the method or apparatus according to the present invention using a graphic user interface or other environments.

The malicious process detector 210, which is an essential component in the apparatus according to the present invention, receives a command from the user in the user interface 201, actually detects a malicious process, and removes the malicious process.

The target process setting unit 211 stores a target process, which is set by the user or a manufacturer to be likely to include a malicious process, and sets added target process during a process of detecting a malicious process according to the present invention. The target process setting unit 211 sets a process of processing test target files as a target process in order to set the test target files and execute the set test target files. For example, when MS Office Excel is set as a target process, files with extension .xls are set, and a process of processing the Excel files is set as a target process.

Also, when the target process generated a child process, even the child process may be set as a target process if specific requirements are fulfilled. The specific requirements will be described in detail with reference to the drawings later.

The process monitoring unit 213 monitors a process executed in the computing environment to which the present invention is applied. The process monitoring unit 213 monitors a process executed in the corresponding environment to monitor if the process set by the target process setting unit 211 is generated and executed.

When the target process set by the target process setting unit 211 is executed among processes monitored by the process monitoring unit 213, the file generation time change monitoring unit 215 monitors if the executed process attempts to change an execution time thereof.

The file generation time change monitoring unit 215 senses the attempt of the target process to change the generation time in response to a call signal when the target process calls a related Application Program Interface (API) to change the generation time.

The file generation time change preventing unit 217 is enabled when the file generation time change monitoring unit 215 senses the attempt of the target process to change the generation time. Specifically, when the target process tries calling the related API to change the generation time, the file generation time change preventing unit 217 provides a substitution function stored therein instead of the API to cripple the attempt of the target process to change the generation time.

When a process detected by the process monitoring unit 213 is a child process of the target process set by the target process setting unit 211, the malicious process detecting unit 219 determines if the child process is a malicious process, based on the file generation time of the child process. Since the malicious process detecting unit 219 makes a decision based on the file generation time, when the malicious process changes its generation time, it is difficult to detect the malicious process. Accordingly, the above-described file generation time change monitoring unit 215 and file generation time change prevention unit 217 are required to prevent the process from changing its generation time.

The forced termination unit 223 forcibly terminates the execution of the child process that is determined as the malicious process by the malicious process detecting unit 219. Thus, the forced termination unit 223 substantially inhibits the execution of the malicious process.

The result output unit 221 displays the result of the processing of the malicious process via the user interface 201 to allow a user to confirm the result.

Figure 3:
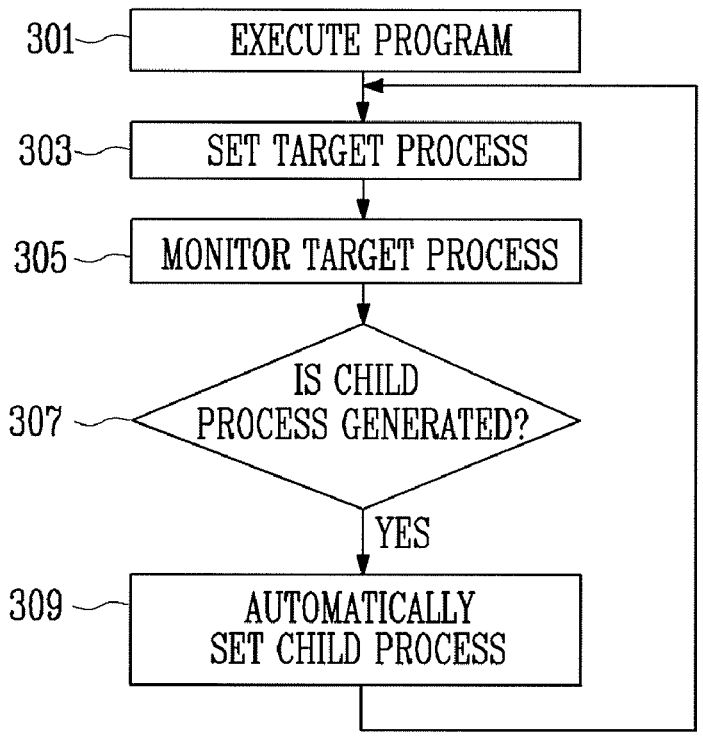
FIG. 3 is a flowchart illustrating a method for determining a target process for detecting a malicious process according to the present invention.

FIG. 3 is a flowchart illustrating a method for determining a target process for detecting a malicious process according to the present invention.

Referring to FIG. 3, a malicious process detection program according to the present invention is executed in step 301. Then, a target process that is preset by the program is loaded and set in step 303, and the target process is monitored in a computing apparatus in step 305.

In this case, when it is detected that a child process of the set target process is generated in step 307, it is determined if the generated child process is a malicious process. Thus, when it is determined that the child process is not the malicious process, the child process is automatically set as a monitoring target process in step 309.

In the method shown in FIG. 3, the child process of the target process is automatically set during the detection of the malicious process. Thus, even if the generation of subordinate child processes of the target process is repeated several times, it is still possible to monitor all the subordinate child processes.

However, the target process itself may be designated by a user before execution or set by a manufacturer during the manufacturing process. Of course, a list of target processes may be periodically updated via the Internet in the same manner as ordinary vaccine programs.

Figure 4:
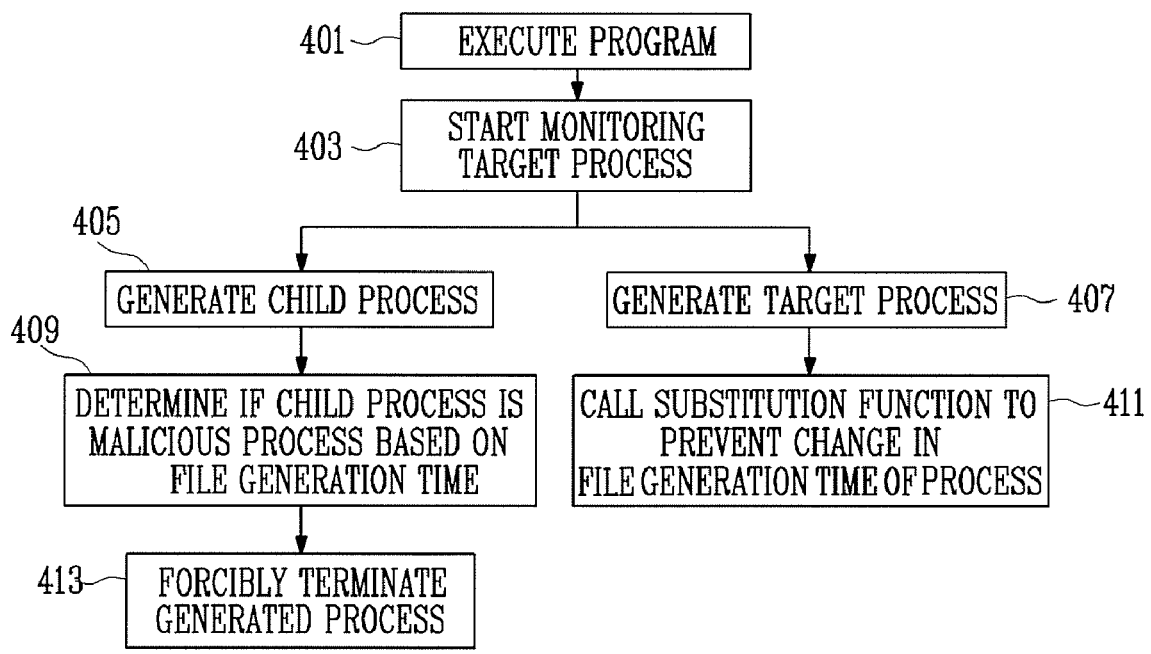
FIG. 4 is a flowchart illustrating a method for determining a malicious process according to the present invention.

FIG. 4 is a flowchart illustrating a method for determining a malicious process according to the present invention.

Referring to FIG. 4, a program according to the present invention is executed in step 401. Then, as described with reference to FIG. 3, a target process is set, the monitoring of the target process is started among processes executed in the computing environment in step 403. In this case, a target process is generated in step 407. When the target process attempts to change its file generation time, a substitution function is called instead of API in order to prevent a change in the file generation time in step 411.

When a child process of the target process is generated in step 405, it is determined if the child process is a malicious process based on a generation of a file of the child process in step 409. In this case, the file generation time of the file of the child process by which the malicious process is determined may be variously set. In the current embodiment of the present invention, it is assumed that when 1 minute is taken to generate the file of the child process, the child process is determined as a malicious process.

Thereafter, when the generated child process is determined as the malicious process, the child process is forcibly terminated in step 413 to preclude the execution of the malicious process.

FIG. 5 is a flowchart illustrating a method for detecting a malicious process according to an exemplary embodiment of the present invention.

Referring to FIG. 5, an apparatus for detecting a malicious process according to the present invention starts to operate in step 501.

Then, a preset target process is registered as a monitoring target process in step 503. The apparatus according to the present invention continues to monitor the monitoring target process to see if new processes are generated or not.

In this case, when generation of a new process is sensed during the execution of the apparatus according to the present invention in step 505, it is determined if the generated process is the preset target process in step 507. However, when any new process is not generated, the apparatus according to the present invention continues to monitor if a new process is generated.

When it is determined that the generated process is the preset target process, it is determined if the target process attempts to change a file generation time in step 509. When it is determined that the target process attempts to change the file generation time, a substitution function included in the apparatus according to the present invention is called instead of API required for changing the file generation time in step 511. When the target process does not attempt to change the file generation time, the apparatus according to the present invention continues to monitor the target process.

Meanwhile, when a newly generated process is a child process of the preset target process in step 513, it is determined if a file generation time of the child process is within a reference time in step 515. When the file generation time of the child process is within the reference time, the child process is determined as a malicious process in step 517, and forcibly terminated in step 519.

When the file generation time of the child process is longer than the reference time, it is determined that the child process is not a malicious process, and the child process is set as a new target process in step 512.

In the above-described process, even if the generation of subordinate child processes of the target process is repeated several times, it is still possible to monitor all the subordinate child processes.

As described above, the present invention provides a method and apparatus for detecting a malicious process. Also, malicious behavior to generate a malicious process can be detected from a normal process based on a time required for executing a child process of a target process.

In the drawings and specification, there have been disclosed typical preferred embodiments of the invention and, although specific terms are employed, they are used in a generic and descriptive sense only and not for purposes of limitation. As for the scope of the invention, it is to be set forth in the following claims. Therefore, it will be understood by those of ordinary skill in the art that various changes in form and detail may be made therein without departing from the spirit and scope of the present invention as defined by the following claims.

What is claimed is:

1. An apparatus for detecting a malicious process, comprising:
a process monitoring unit for monitoring a process generated in a computing environment;
a target process setting unit for previously setting a test target process among the processes confirmed by the process monitoring unit;
a file generation time change monitoring unit for monitoring if the target process set by the target process setting unit requests to change a file generation time;
a file generation time change preventing unit for preventing a change in the file generation time of the target process when the target process requests to change the file generation time; and
a malicious process detecting unit for determining that a child process of the target process set by the target process setting unit is a malicious process if the child process generates a file within a predetermined reference time.

2. The apparatus according to claim 1, further comprising:
a forced termination unit for forcibly terminating the child process determined as the malicious process by the malicious process detecting unit; and
a result output unit for outputting a determination result of the malicious process detecting unit.

3. The apparatus according to claim 1, wherein the target process set by the target process setting unit executes a previously monitored target file.

4. The apparatus according to claim 1, wherein the file generation time change monitoring unit monitors if the target process calls an Application Program Interface (API) required for changing the file generation time.

5. The apparatus according to claim 1, wherein the file generation time change preventing unit provides a substitution function stored therein instead of the API called by the target process to prevent the change in the file generation time of the target process.

6. The apparatus according to claim 1, wherein the child process is generated by the target process set by the target process setting unit.

7. The apparatus according to claim 1, wherein when the malicious process detecting unit determines that the child process is not a malicious process, the target process setting unit sets the child process as a target process.

8. A method for detecting a malicious process, comprising:
monitoring if a process generated in a computing environment is a child process of a preset target process, and
monitoring if the generated process calls an Application Program Interface (API) required for changing a file generation time and providing a substitution function instead of the API when the generated process is the preset target process; and
recognizing the generated process as a malicious process when the process monitored to be the child process generates a file within a predetermined reference time.

9. The method according to claim 8, wherein the preset target process executes a previously monitored targeted file.

10. The method according to claim 8, wherein the child process is generated by the preset target process.

11. The method according to claim 8, further comprising registering the generated process as a target process when the process monitored to be the child process generates the file longer than the predetermined reference file.

12. The method according to claim 8, further comprising forcibly terminating the process recognized as the malicious process.

* * * * *